United States Patent
Zhang et al.

(10) Patent No.: US 7,598,703 B2
(45) Date of Patent: Oct. 6, 2009

(54) PORTABLE CHARGERS HAVING POWER FACTOR CORRECTION CAPABILITY FOR USE WITH ELECTRIC VEHICLES

(75) Inventors: JianHua Zhang, Shanghai (CN); Bin Guo, Shanghai (CN); Kaihua Niu, Shanghai (CN)

(73) Assignee: BYD Company Limited, Shenzhen (CN)

( * ) Notice: Subject to any disclaimer, the term of this patent is extended or adjusted under 35 U.S.C. 154(b) by 245 days.

(21) Appl. No.: 11/648,246

(22) Filed: Dec. 29, 2006

(65) Prior Publication Data

US 2007/0153560 A1 Jul. 5, 2007

(30) Foreign Application Priority Data

Dec. 29, 2005 (CN) .................... 2005 2 0147127 U

(51) Int. Cl.
*H01M 10/46* (2006.01)
(52) U.S. Cl. ...................................... 320/107
(58) Field of Classification Search ................ 320/107, 320/112, 141, 161
See application file for complete search history.

(56) References Cited

U.S. PATENT DOCUMENTS 5,371,456 A * 12/1994 Brainard .................. 320/161

2005/0270812 A1 * 12/2005 Vinciarelli .................. 363/65

FOREIGN PATENT DOCUMENTS

CN 200420082467 8/2004

* cited by examiner

*Primary Examiner*—Edward Tso
(74) *Attorney, Agent, or Firm*—Venture Pacific Law, PC

(57) ABSTRACT

A type of portable chargers with power factor correction capability for use with electric vehicles comprises of a filtering rectifier module, an integrated circuit power supply module, a DC-DC PFC module and a DC-DC BUCK module. The filtering rectifier module has one input port and two output ports. The IC power supply module has one input port and two output ports. The DC-DC PFC module has two input ports and one output port. The DC-DC BUCK module has two input ports and one output port. The two output ports of the filtering rectifier module are connected to the input port of IC power supply module and the input port of the DC-DC PFC module respectively. The output port of the DC-DC PFC module is connected to one of the input ports of the DC-DC BUCK module. The two output ports of IC power supply module are connected, respectively, to the other input port of the DC-DC PFC module and to the other input port of the DC-DC BUCK module. This new type of portable chargers embodied with this invention can effectively reduce reactive power in the power system and develop greater power.

4 Claims, 4 Drawing Sheets

PORTABLE CHARGERS HAVING POWER FACTOR CORRECTION CAPABILITY FOR USE WITH ELECTRIC VEHICLES

CROSS REFERENCE

This application claims priority from a Chinese patent application entitled the following Chinese patent applications: "Portable Chargers for Use with Electric Vehicles" filed on Dec. 29, 2005, having a Chinese Application No. 200520147127.2. The above application is incorporated herein by reference.

FIELD OF INVENTION

The present invention involves a type of chargers, specifically a type of portable charger with power factor correction capability for use with electric vehicles.

BACKGROUND OF INVENTION

There are many types of chargers for electric vehicles currently on the market. However, they do not have power factor correction capability. This causes harmonics and reactive power in the power system, especially with high power electrical apparatuses. Additionally, the output of current electric vehicle chargers is fairly low. They do not have the charging function above 3 kW, causing low charge efficiency.

SUMMARY OF INVENTION

The goal of this invention is to overcome the shortcomings of harmonics and reactive power in the power system caused by the lack of power factor correction ("PFC") capability with the current charger technologies, and to provide a type of high power electric vehicle chargers that has the capability for power factor correction.

This invention provides portable chargers used with electric vehicles that have power factor correction capabilities. The charger comprises of a filtering rectifier module (100), an IC power supply module (200), a DC-DC PFC module (300) and a DC-DC BUCK module (400). The filtering rectifier module (100) has one input port and two output ports. The IC power supply module (200) has one input port and two output ports. The DC-DC PFC module (300) has two input ports and one output port. The DC-DC BUCK module (400) has two input ports and one output port. The two output ports of the filtering rectifier module (100) are connected to the input port of the IC power supply module (200) and the input port of DC-DC PFC module (300); respectively. The output port of DC-DC PFC module (300) is connected to one of the input ports of DC-DC BUCK module (400). The two output ports of DC-DC DFC module (200) are connected, respectively, to the other input port of the DC-DC PFC module (300) and to the other input port of the DC-DC BUCK module (400).

The chargers provided by this invention have power factor correction capability. They cause relatively minor reactive power in the power system and meet the requirements for high power charging.

DESCRIPTION OF DRAWINGS

The foregoing and other objects, aspects and advantages of the invention will be better understood from the following detailed description of the preferred embodiments of this invention when taken in conjunction with the accompanying drawings in which.

DETAILED DESCRIPTION OF EMBODIMENTS

The following paragraphs describe the preferred embodiments of this invention and as illustrated in the attached figures.

Figure 1:
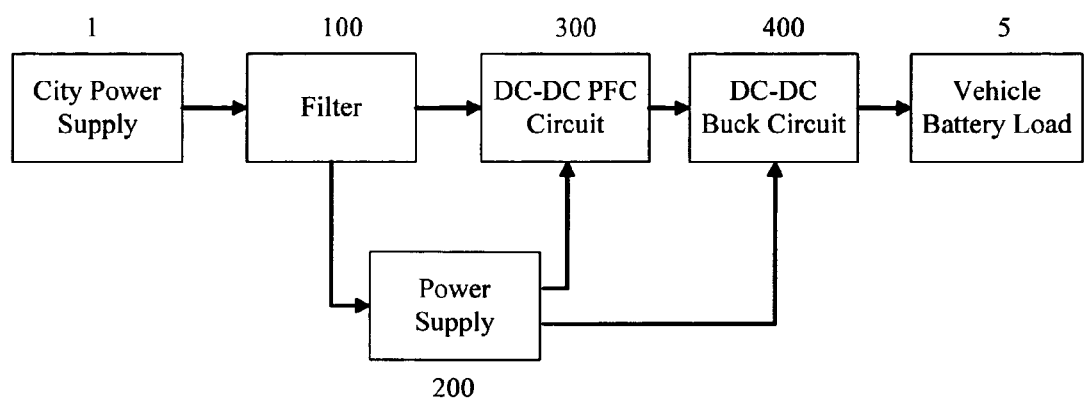
FIG. 1 is a component diagram of an embodiment of this invention.

FIG. 1 is a component diagram of chargers of this invention. In the diagram, stated charger comprises of a filtering rectifier module (100), a chip power supply module (200), a DC-DC PFC module (300) and a DC-DC BUCK module (400). For easy understanding, FIG. 1 also includes a module 1 to denote 220AC city power and module 5 to denote the battery load of the electric vehicle. The filtering rectifier module (100) has one input port and two output ports. The chip power supply module (200) has one input port and two output ports. The DC-DC PFC module (300) has two input ports and one output port. The DC-DC BUCK module has two input ports and one output port. The two output ports of the filtering rectifier module (100) are connected to the input port of the chip power supply module (200) and the input port of DC-DC PFC module (300); respectively. The output port of the DC-DC PFC module (300) is connected to one of the input ports of DC-DC BUCK module (400). The two output ports of chip power supply module (200) are connected, respectively, to the other input port of said DC-DC PFC module (300) and to the other input port of said DC-DC BUCK module (400).

The filtering rectifier module (100) is used to receive the residential 220v residential AC power and to convert residential AC power to full-wave rectified DC power. The chip power supply module (200) is used to incept output voltage from filtering rectifier module (100) and to transmit the received power to both the DC-DC PFC module (300) and the DC-DC BUCK module (400) as the drive signal. The DC-DC PFC module (300) is driven by the chip power supply module (200) to generate the full-wave DC power from the filtering rectifier module (100), to output constant DC signals, and to shut off the DC-DC PFC module (300) in the event of excessive current. The DC-DC BUCK module (400) receives the DC power from DC-DC PFC module (300) and to convert incepted DC power to the voltages that are suitable for electrical charging and are guaranteed for voltage stability.

Figure 2:
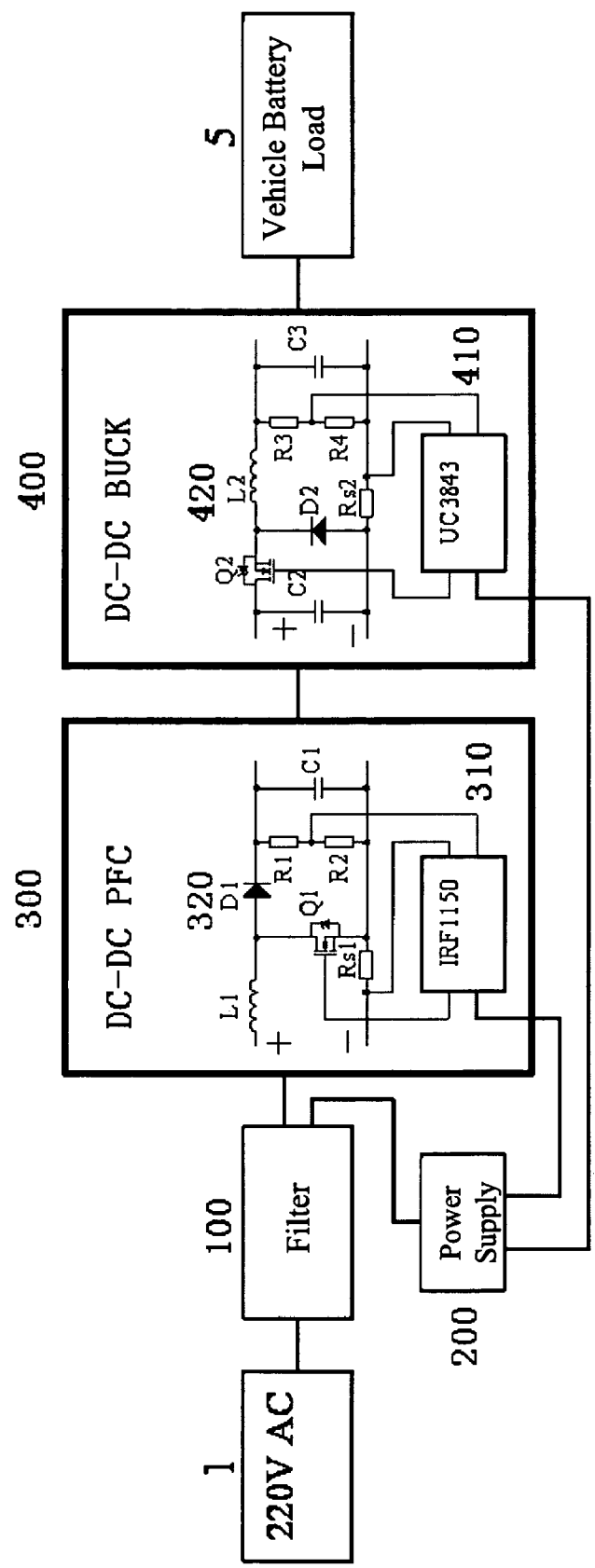
FIG. 2 is a circuit diagram of a preferred embodiment of this present invention.

The following paragraphs describe the preferred embodiment of this new type invention, illustrated in FIG. 2.

In the preferred embodiment designed in accordance with this invention, the described filtering rectifier module (100) can be the filtering rectifier modules currently used on electric vehicles.

In the preferred embodiment designed in accordance with this invention, the described chip power supply module (200) comprises an isolation transformer (not illustrated) that is used to convert received signal to at least two-way constant signals. The chip power supply module (200) can be commonly used power supply chips such as UC3843 or UC3842, 3844, etc, in same chip series.

In the preferred embodiment designed in accordance with this invention, the described DC-DC PFC module (300) comprises a control circuit (310) and a PFC circuit (320) corresponding to the control circuit (310). The PFC circuit (320)

has positive and negative nodes to receive output from the filtering rectifier module (100). The PFC circuit (320) has a MOS switch Q1, divider resistors R1 and R2, a voltage sampling resistor Rs1, a charging capacitor C1, an inductor L1 and a diode D1. The drain of said MOS switch is connected to the positive node of the PFC circuit (320) via inductor L1 and to the positive node of diode D1. The cathode of diode D1 is connected to serial resistors R1, R2 and voltage sampling resistor Rs1, which is connected to the negative node of the PFC circuit (320). The source of MOS switch Q1 is connected to the negative node of PFC circuit (320) via voltage sampling resistor Rs1. The gate of MOS switch Q1 receives the output signals from the control circuit (310) of PFC module. The voltages obtained from and between resistors R1 and R2 are introduced to the control circuit (310) of the PFC module. The negative node of PFC circuit (320) is connected to the control circuit (310) of PFC module as the signal input port. The charging capacitor C1 is parallel to R1 and R2.

The described inductor L1 is used to store energy to guarantee that there will be current flow to capacitor C1 when the circuit is open. The diode D1 is used to guarantee the unidirectional flow of the current. The following ICs can be used as PFC module control circuit (310): UC 3854, a product of Modulerode, L6561, a product of ST, NCP1601, a product of ON Semi and UCC2851x series by TI. Preferably, the PFC module control circuit (310) is IRF1150, which has high power. The PFC module control circuit (310) samples the voltage between divider resistors R1 and R2, and controls pulse-width modulation (PWM) of the MOS switch, thus stabilizes the output of the capacitor C1. Additionally, PFC module control circuit (310) samples the main circuit current. The PFC module will be shut off when the current is excessive in order to guarantee the safety of the electric device.

In this preferred embodiment designed in accordance with this invention, the described DC-DC BUCK module (400) comprises a BUCK module control circuit (410) and a BUCK circuit (420) corresponding to the control circuit (410). The BUCK circuit (420) has positive and negative nodes to receive PFC circuit's (420) output. The BUCK circuit (420) comprises a filtering capacitor C2, a diode D2, a MOS switch Q2, an inductor L2, divider resistors R3 and R4, a voltage sampling resistor Rs1 and a charging capacitor C3. The filtering capacitor C2 is connected to the positive and negative nodes of the BUCK circuit to filter out the high frequency clutters. The drain of said MOS switch is connected to the positive node of BUCK circuit. The source is connected to inductor L2 and the cathode of diode D2. The gate connects to BUCK module control circuit (410). Inductor L2 is connected to resistors R3, R4 and voltage sampling resistor Rs1, which is connected to the negative node of the BUCK circuit. The anode of diode D2 is connected to the negative node of the BUCK circuit. The voltages obtained from and between resistors R1 and R2 are introduced to the BUCK module control circuit (410). The signal after Rs2 is introduced to the BUCK module control circuit from the negative node of the BUCK circuit. The charging capacitor C3 is parallel to resistors R3 and R4.

The stated inductor L2 is used to store the energy to guarantee the current will flow to capacitor C1 when the circuit is open. The diode D2 is used to guarantee the unidirectional flow of the current. The preferred BUCK module control circuit (410) is UC3843. The BUCK module control circuit (410) samples the voltage between divider resistors R3 and R4 and controls pulse-width modulation (PWM) of the MOS switch Q2, thus to stabilize the output of the charging capacitor C3, thus stabilizes the output of the capacitor C3. Therefore, when the electric vehicle battery load (5) connects to the both electrodes of the charging capacitor C3 during charging, the current output will not reduce significantly when the voltage output increases due to the increase of battery voltage.

Figure 3:
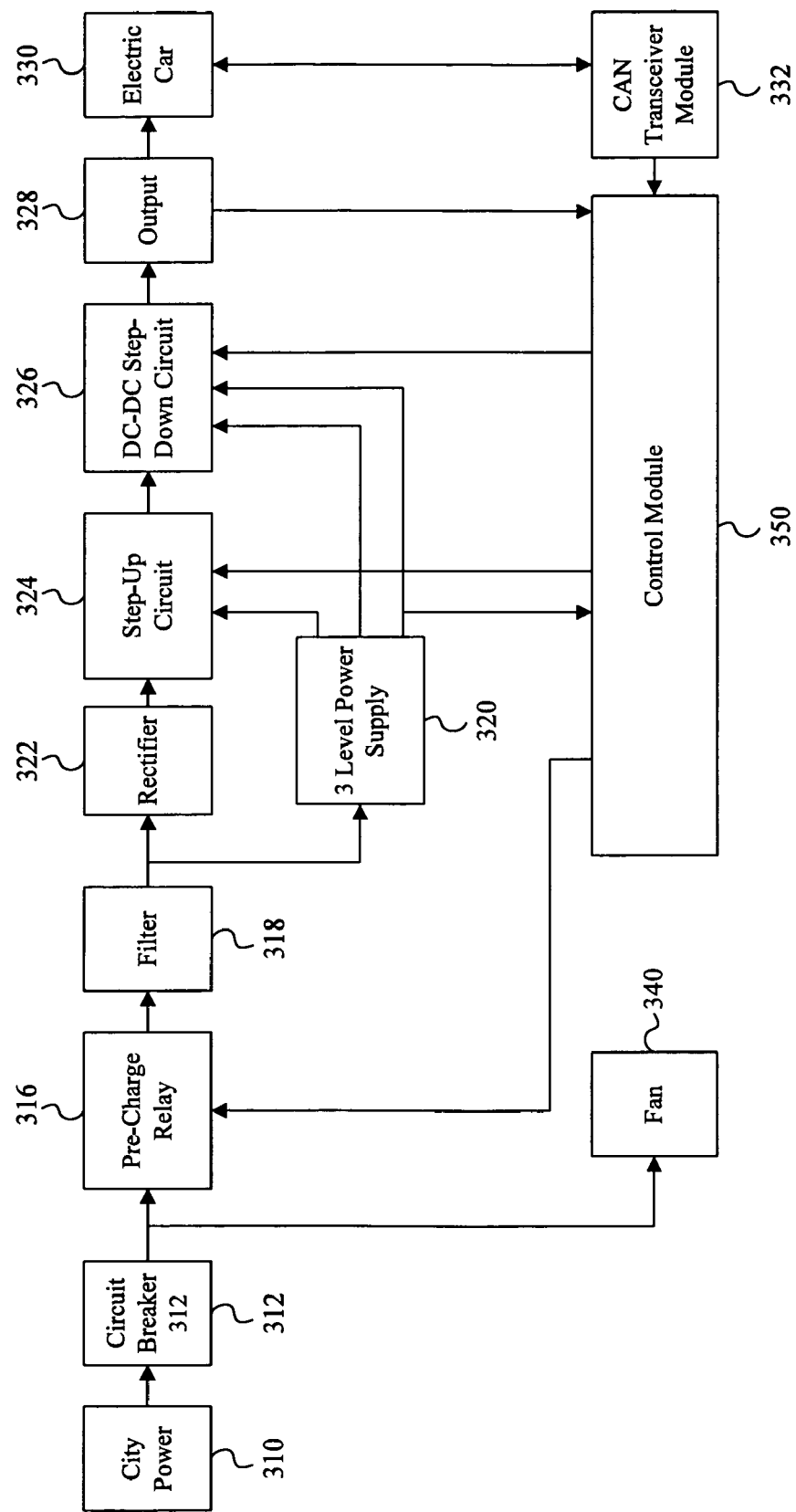
FIG. 3 is a block diagram of a preferred embodiment of the present invention.

Referring to FIG. 3, the city power 310 provided is 220v and in the preferred embodiment the circuit can be designed as such.

There is a circuit breaker/relay device 312 that can serve as the main power switch as well. Such device serves as a safety feature in order to shut power off in an abnormal event.

The relay device 312 can be operated by a control circuit module 350. There are also two relays, one serves as a power switch 312 and the other serves as a pre-charge switch 314 (for controlling current flow in a short-circuit event, perhaps with a current sensing power resistor).

There is a filter 318 for filtering the power being supplied to help in providing a stable power output.

The power is then provided to a three-level supplemental power supply 320. Here, the alternating current from the filter 318 is provided to the supplemental power supply 320, which outputs isolated DC power supply to the PFC step-up voltage converter using 13.5v, a DC-DC step down voltage converter using 12V and 15V, and a control module 350 using 12v.

A rectifier 322 is also provided to convert alternating current to direct current, thereby allowing the step-up converter 324 to operate.

The PFC step-up converter 324 converts the rectifier 322 output from half-wave DC to constant DC where the designed output is 380VDC. The preferred control IC is IR11501S to regulate the current output. There are other ICs that can be used as well to achieve PFC step-up function.

The DC-DC step-down converter 326 receives the DC output from the step-up converter 324 and adjusts to voltage to 188V-360V (the operating range of the 94 battery) and also adjusts the constant current output to 5 A. The preferred control IC is UC3843, achieving constant voltage, over voltage protection, over current protection, and working with comparator to achieving constant current output. There are other ICs as well for DC-DC step-down conversion.

The control module 350 includes: a main switch (on the top of the box), a control relay which allows, after the main switch is turned off, first turning on the main circuit and through the current-sensing power resistor controlling the amount of input power with respect to the current of the large capacitor in the circuit (a protective function). After a delay of 2 seconds (adjustable), the second relay closes short-circuit current-sensing power resistor allowing returning to normal operation. After 2 more seconds of delay (adjustable), PFC step-up circuit 324 and DC-DC step-up circuit 326 are simultaneously closed and signals locked. At this time the PFC step-up circuit 326 operates immediately, it raises the voltage level to the designed level (380v) within 1 second; and the DC-DC step-down circuit 326 starts after 2 seconds (adjustable), adjusting input voltage to the proper output voltage level, satisfying the output level at constant 5A (adjustable). Also, the control module is equipped to detect over-voltage, over-current situations; upon the occurrences of those type of events, the relay, PFC step-up circuit and DC-DC step-down circuit would be closed. At this time, the main power supply would need to be shut-down and restarted in order to return to operation. If high temperature is detected, the relay, PFC step-up circuit, and DC-DC step-down circuit would also be shut off. Once the temperature returns to a safe range, like resetting the on switch, the charger would be restarted. The module also includes indicator lights, indicator light for power input (red color), and indicator light for when output voltage is operating (green color).

The controller area network ("CAN") transceiver module 332, using a single chip solution (preferring PIC IC while other ICs can be used as well), using the CAN transceiver IC, can allow the charger to connect to the CAN network of the electric vehicle. When a charging signal is received allowing charging, the charger is allowed to operate, and during charging, if a stop charging signal is received (such as a fully-charged signal, a serious malfunction signal, over-voltage, over-current, over-temperature, etc.), CAN transceiver module 332 would inform the control module 350 to close the relay, thereby closing the circuit and stopping the charge.

The fan 340 reduces heat. Because city utility power is used, after the charger is turned on, it will continue to operate to provide air to cool the components.

The electric car can be vehicles using type 94 batteries. The normal operating range of such battery pack is 188v-360v.

Figure 4:
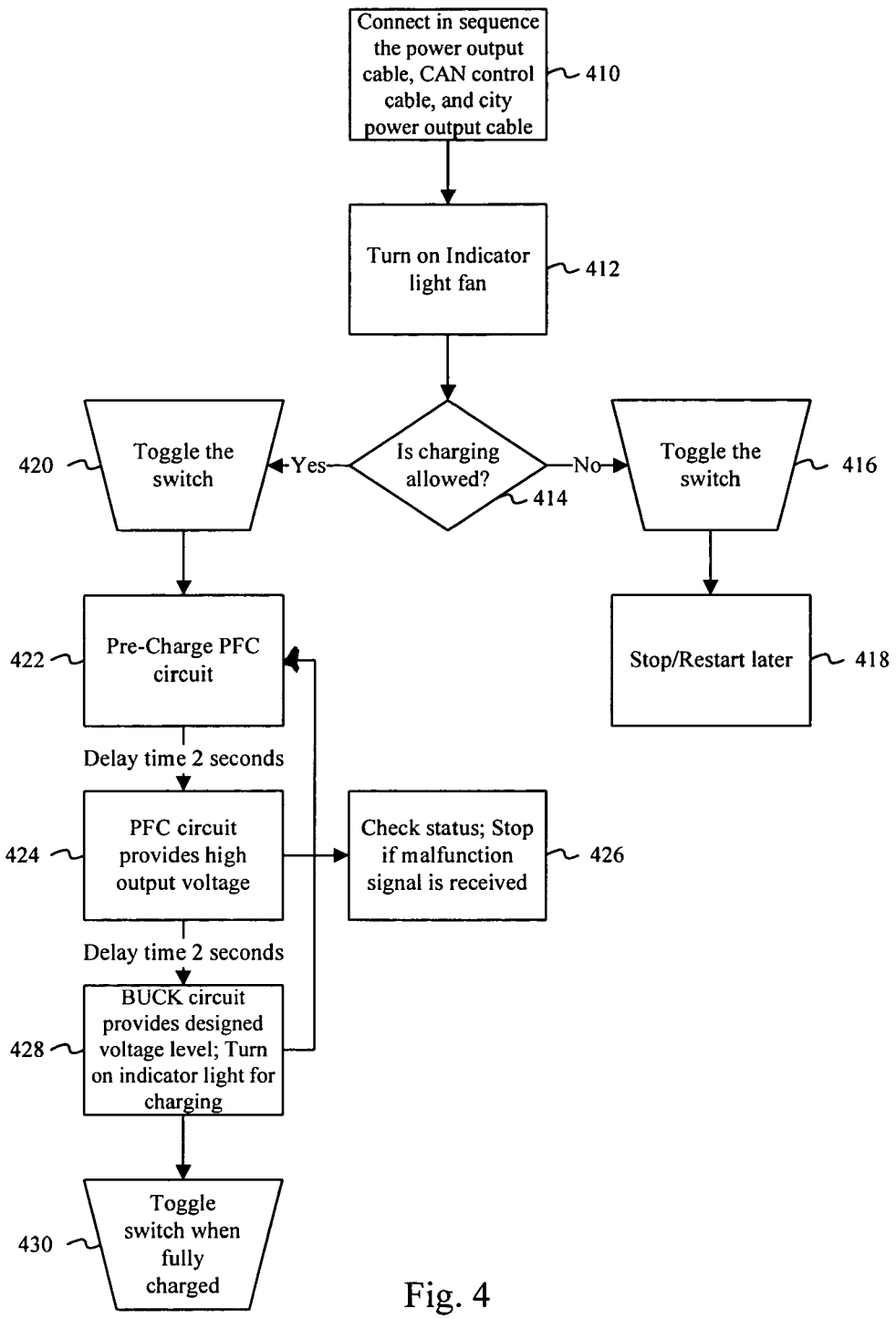
FIG. 4 is a flow chart of a preferred method of operation of the present invention.

Referring to FIG. 4, the operational steps of the preferred embodiment of the charger of the present invention is illustrated. First, the city power input cable, CAN control cable, and power output cable are connected 410. The indicator light and fan are turned on 412. In the next step 414, whether charging is allowed or not is communicated between the charger and the electric vehicle via the CAN control cable. If charging is not allowed, the switch is toggled 416 and the process is stop (or can be restarted later) 418. If charging is allowed, the switch is toggled 420 and pre-charges the capacitor of the PFC circuit 422. After a pre-set delay, the PFC circuit provides a high voltage (380V) 424. The status is also checked to see if charging should be continued or should be stopped (due to malfunction) 426. After another pre-set delay, the buck circuit will operate and provide the designed voltage level and the charging indicator light is turned on 428. The cycle, 422, 424, 426, and 428 operate continuously. Once it is fully charged, the switch can be toggled 430.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but also all those other and further alterations and modifications as would be apparent to those of ordinary skilled in the art.

We claim:

1. A portable charger having power factor correction capability for use with electric vehicles, comprising: a filtering rectifier module, a chip power supply module, a DC-DC power factor correction ("PFC") module, and a DC-DC BUCK module, wherein the filtering rectifier module has one input port and two output ports; the chip power supply module has one input port and two output ports; the DC-DC PFC module has two input ports and one output port; the DC-DC BUCK module has two input ports and one output port; the two output ports of the filtering rectifier module are connected to the input port of the chip power supply module and the input port of the DC-DC PFC module, respectively; the output port of the DC-DC PFC module is connected to one of the input ports of the DC-DC BUCK module; the two output ports of the chip power supply module are connected, respectively, to the other input port of the DC-DC PFC module and to the other input port of the DC-DC BUCK module.

2. The portable charger of claim 1, wherein, the chip power supply module comprises an isolation transformer that converts the received signals to at least two-way constant voltage signals.

3. The portable charger of claims 1, wherein the DC-DC PFC module comprises a PFC module control circuit and a PFC circuit corresponding to the control circuit; the PFC circuit has both positive and negative electrodes that incept filtering rectifier module output; the PFC circuit has a MOS switch Q1, divider resistors R1 and R2, a voltage sampling resistor Rs1, a charging capacitor C1, an inductor L1 and a diode D1; the drain of the MOS switch is connected to positive electrode of the PFC circuit via inductor L1 and is connected to the anode of the diode D1; the cathode of diode D1 is connected to serial resistors R1, R2 and voltage sampling resistor Rs1, which is connected to the negative electrode of the PFC circuit; the source of MOS switch Q1 is connected to the negative electrode of PFC circuit via voltage sampling resistor Rs1; the gate of MOS switch Q1 incepts the output signals from the control circuit of PFC module; the voltage obtained with voltage division formulas of series resistors R1 and R2 is introduced to the control circuit of PFC module; the negative electrode of PFC circuit is connected to the control circuit of PFC module as the signal input port; the charging capacitor C1 is parallel to R1 and R2.

4. The portable charger of claims 1, wherein the DC-DC BUCK module comprises a BUCK module control circuit and a BUCK circuit corresponding to the control circuit; the BUCK circuit has positive and negative nodes to incept the output of PFC circuit; the BUCK circuit comprises a filtering capacitor C2, a diode D2, a MOS switch Q2, an inductor L2, resistors R3 and R4, a voltage sampling resistor Rs1 and a charging capacitor C3; the filtering capacitor C2 is connected to positive and negative electrodes of the BUCK circuit; the drain of said MOS switch is connected to the positive electrode of the BUCK circuit; the source is connected to inductor L2 and the cathode of diode D2; the gate is connected to the BUCK module control circuit; the inductor L2 is connected to resistors R3, R4 and voltage sampling resistor Rs1, which is connected to the negative electrode of the BUCK circuit; the anode of diode D2 is connected to the negative electrode of BUCK circuit; the voltage obtained with voltage division formulas of series resistors R1 and R2 is introduced to the BUCK module control circuit; the signals after Rs2 are introduced to the BUCK module control circuit from the negative electrode of BUCK circuit; and the charging capacitor C3 is parallel to resistors R3 and R4.

* * * * *